United States Patent
Haas et al.

(10) Patent No.: US 9,403,575 B2
(45) Date of Patent: Aug. 2, 2016

(54) METHOD FOR REDUCING THE STEERING TORQUE OF A TWO-WHEELER WHEN NEGOTIATING CURVES

(71) Applicants: Hardy Haas, Ditzingen-Schoeckingen (DE); Markus Lemejda, Ludwigsburg (DE); Anja Wahl, Markgroeningen (DE)

(72) Inventors: Hardy Haas, Ditzingen-Schoeckingen (DE); Markus Lemejda, Ludwigsburg (DE); Anja Wahl, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/390,732

(22) PCT Filed: Feb. 8, 2013

(86) PCT No.: PCT/EP2013/052531
§ 371 (c)(1),
(2) Date: Oct. 3, 2014

(87) PCT Pub. No.: WO2013/149746
PCT Pub. Date: Oct. 10, 2013

(65) Prior Publication Data
US 2015/0057888 A1    Feb. 26, 2015

(30) Foreign Application Priority Data
Apr. 4, 2012   (DE) .......................... 10 2012 205 520

(51) Int. Cl.
*B62K 21/08*    (2006.01)
*B62K 21/00*    (2006.01)

(52) U.S. Cl.
CPC ................ *B62K 21/08* (2013.01); *B62K 21/00* (2013.01)

(58) Field of Classification Search
CPC .......... B62K 21/08; B62K 21/00; F16F 9/535; F16F 9/125
USPC ............................. 701/41; 180/219; 280/5.512
See application file for complete search history.

(56) References Cited

U.S. PATENT DOCUMENTS

| | | | |
|---|---|---|---|
| 4,811,807 A | 3/1989 | Schier | |
| 7,143,853 B1 | 12/2006 | Mercier et al. | |
| 2002/0157909 A1* | 10/2002 | Hasegawa | F16F 9/466 188/290 |
| 2009/0302557 A1* | 12/2009 | Hara | B62K 21/08 280/5.512 |
| 2010/0051377 A1* | 3/2010 | Sugitani | B62D 7/224 180/443 |

FOREIGN PATENT DOCUMENTS

| | | |
|---|---|---|
| CN | 101588959 A | 11/2009 |
| DE | 102010003951 | 10/2011 |
| EP | 2130754 | 12/2009 |
| JP | 6364888 | 3/1988 |
| JP | 2009083578 | 4/2009 |
| JP | 2009126432 | 6/2009 |
| JP | 2009292258 | 12/2009 |
| JP | 2011507744 | 3/2011 |
| JP | 2012025181 | 2/2012 |

OTHER PUBLICATIONS

International Search Report for PCT/EP2013/052531, issued on Apr. 16, 2013.

* cited by examiner

*Primary Examiner* — Marthe Marc-Coleman
(74) *Attorney, Agent, or Firm* — Norton Rose Fulbright US LLP

(57) ABSTRACT

A method for reducing the steering torque of a two-wheeler when negotiating curves. For the case that the front wheel is braked while negotiating a curve, the damping in an adaptive steering stamper is increased as a function of at least one state variable characterizing the negotiation of a curve.

13 Claims, 1 Drawing Sheet

METHOD FOR REDUCING THE STEERING TORQUE OF A TWO-WHEELER WHEN NEGOTIATING CURVES

FIELD OF THE INVENTION

The present invention relates to a method for reducing the steering torque of a two-wheeler when negotiating curves.

BACKGROUND INFORMATION

When the front wheel of a motorized two-wheeler is braked while negotiating a curve, this results in a steering torque disturbance around the steering axis of the two-wheeler, thereby uprighting the motorcycle, as a result of which the two-wheeler is forced into a larger curve radius. The driver must counteract such steering torque disturbances; otherwise, the risk exists that the two-wheeler departs from the intended lane, resulting in an accident. The steering torque disturbance results from the tire contact point moving to the side of the tire due to the inclination and the brake force acting on the tire contact point of the front wheel. With increasing inclination, the size of the disturbing force lever arm is increased, and consequently the unintended steering torque disturbance uprights the two-wheeler. Wider tires are additionally able to enlarge the disturbing force lever arm and steering torque disturbance.

SUMMARY

An object of the present invention is to improve the controllability of a two-wheeler in braking operations in curves.

The method for steering torque reduction refers to motorized two-wheelers, in particular motorcycles, negotiating curves during a simultaneously occurring braking operation of the front wheel of the two-wheeler. In order to reduce the steering torque disturbances occurring here, which act around the steering axis of the two-wheeler and which seek to upright the two-wheeler, and as a result improve the controllability of the two-wheeler, the two-wheeler is provided with an active or adaptive steering damper, the damping function of which may be set during travel via a regulating or control unit. In order to reduce the steering torque disturbances, the damping in the adaptive steering damper is increased as a function of at least one state variable characterizing the negotiation of a curve, as a result of which peaks in the steering torque disturbance are avoided and the level of steering torque disturbances is reduced overall. Consequently, the countersteering torque to be applied by the driver for compensating the steering torque disturbances is lower, which results in better controllability and improved driving behavior, objectively and subjectively. Even without a corrective steering movement by the driver, the risk is reduced that the uprighting causes the two-wheeler to depart from the roadway as a consequence of the steering torque disturbance due to the larger curve radius. The driving safety is increased significantly.

Basically, various adaptive steering dampers may be used. For example, electrorheological, magnetorheological and hydraulic adaptive steering dampers are considered, the damping function of which may be set during travel.

The method for setting the damping in the adaptive steering damper takes place in a regulating or control unit in the two-wheeler, sensors in the two-wheeler advantageously delivering information concerning the instantaneous state variable characterizing the negotiation of a curve, which is processed in the regulating or control unit. The adaptive steering damper is provided with an actuator for setting the damping, which takes place via signals generated in the regulating or control unit.

Advantageously, the state variable characterizing the negotiation of a curve is the inclination angle, which denotes the inclination of the motorcycle center plane in relation to a vertical. For passing through the curve, the motorcycle is brought into an inclination, as a result of which the tire contact point, i.e., the effective center point of the tire contact surface, migrates from the center of the tire to the side. The lateral distance to the tire center causes a steering torque disturbance around the vertical axis when the front wheel is braked simultaneously and a brake force is effective in the tire contact point. With increasing inclination, the steering torque disturbance becomes larger; likewise, a wider tire enlarges the disturbing force lever arm and consequently the steering torque disturbance.

In order to limit the steering torque disturbance, the damping in the steering damper is set as a function of the inclination angle. With increasing inclination angle, the damping is increased, which counteracts the steering torque disturbance, so that the driver must consequently apply only a lower countersteering torque for compensating the steering torque disturbance and for maintaining the desired inclination.

In principle, other state variables characterizing a negotiation of a curve may be used alternatively or additionally to the inclination angle for evaluating whether the damping in the adaptive steering damper should be changed. It is, for example, possible to use the steering angle additionally or alternatively and include it in ascertaining the instantaneous damping to be set in the steering damper. Also, the steering torque or the yaw rate of the vehicle is considered. Furthermore, additional vehicle state variables, in particular concerning the longitudinal and/or transverse dynamics of the vehicle such as, for example, the vehicle speed, may be considered, if necessary, in ascertaining the damping in the steering damper. The state variables are either measured using suitable sensors or ascertained arithmetically from measured variables, for example, using suitable vehicle models. Furthermore, the braking torque acting instantaneously on the front wheel is ascertained using sensors, for example, from the brake pressure of a hydraulic braking system. If the two-wheeler is equipped with an anti-lock braking system (ABS), its sensors may be used for ascertaining the brake pressure.

If the buildup of brake pressure in the braking system of the front wheel is relatively slow, the steering torque disturbance builds up steadily, while an abrupt buildup of brake pressure may result in vibrations in the progress of the steering angle and the steering torque, since the combination of motorcycle frame, front fork and tire forms a vibration-capable system. Also in the case of vibrations in the steering torque or steering angle, a damping is possible by influencing the adaptive steering damper.

The two-wheeler may, if necessary, be equipped with a steering torque actuator, which makes active setting of the effective steering torque possible. In principle, the steering torque disturbance may also be counteracted via the steering torque actuator, steering torque actuators of a relatively large size being necessary for complete compensation. A combination with an adaptive steering damper makes it possible to use steering torque actuators of a smaller size, without having to accept limitations of function. The adaptive steering damper has the advantage of a fast operating mode and the damping of high torque peaks, whereas additional functions such as an oversteer prevention function or supportive servo steering may be implemented as a comfort function using the steering torque actuator. The steering torque actuator may be used supportively for at least partial compensation of the steering torque disturbances.

If necessary, a lower threshold value may be considered for the state variable characterizing a negotiation of a curve, so that a change of damping in the steering damper is carried out only if the state variable exceeds the threshold value. The change of the damping may also be withdrawn if, during the negotiation of a curve, an already carried out change of damping again falls below the threshold value.

DETAILED DESCRIPTION

Figure 1:
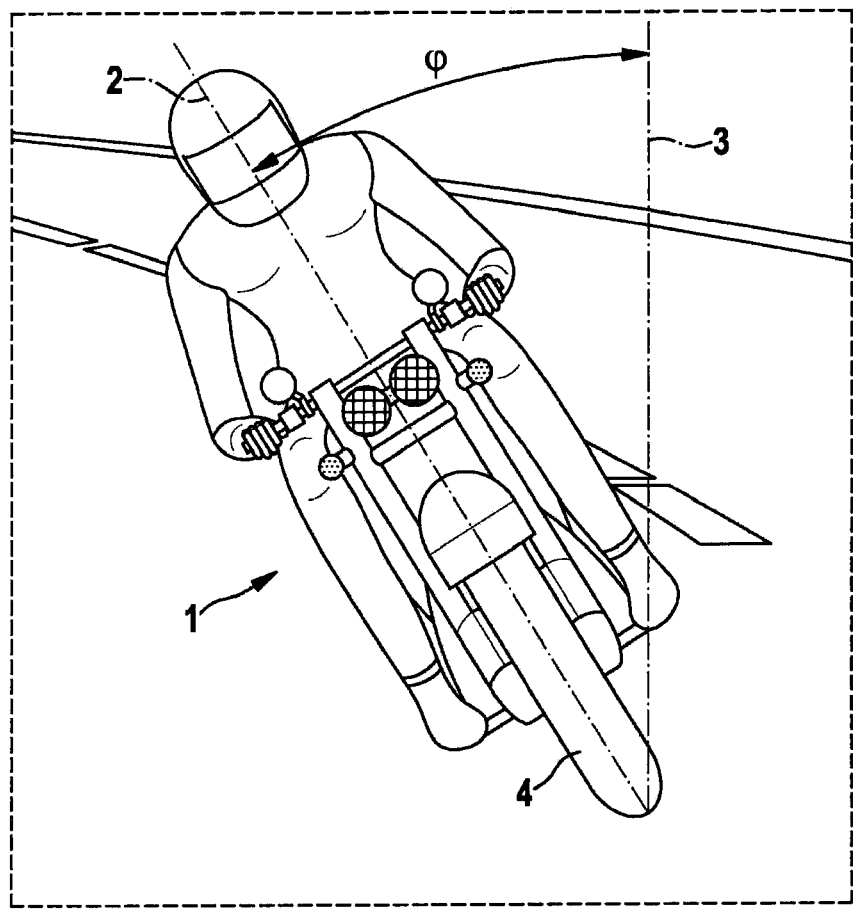
FIG. 1 shows a motorcycle in inclination when negotiating a curve.

FIG. 1 shows a motorcycle 1 negotiating a curve. Motorcycle 1 is in inclination; inclination angle $\phi$ characterizes the angular position between a vehicle center plane 2 and a vertical 3. In the upright position of motorcycle 1, vehicle center plane 2 lies in vertical 3.

Figure 2:
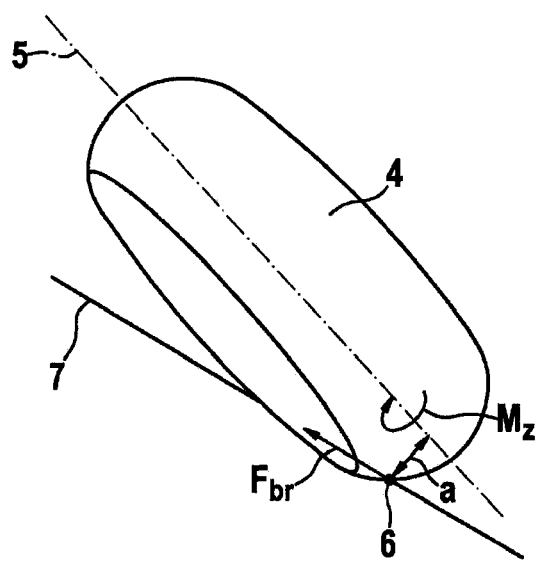
FIG. 2 shows the forces and torques on the front wheel in the case of inclination in the curve and simultaneously effective brake force.

FIG. 2 shows front wheel 4 in individual position in inclination. Due to the inclination, tire contact point 6 of tire 4 migrates on roadway 7 from the tire center, through which steering axis 5 passes, to the side of the tire. Tire contact point 6 has distance a to the tire center, the distance forming the disturbing force lever arm. If front wheel 4 is braked, braking force $F_{br}$ takes effect in tire contact point 6, which together with disturbing force lever arm a guides the vertical or steering axis to steering torque disturbance $M_z$, the steering torque disturbance seeking to upright the motorcycle. According to the equation below, steering torque disturbance $M_z$ may $$M_z = s(\phi) \cdot F_{br}$$

be ascertained from a function s which is dependent on inclination angle $\phi$ and brake force $F_{br}$. Brake force $F_{br}$ may be ascertained, for example, in a first approximation linearly as a function of the hydraulic brake pressure in the braking system on the front wheel, the brake pressure being measured, for example, in an anti-lock braking system ABS. Inclination angle $\phi$ may be determined using suitable sensors.

To improve the controllability of the motorcycle during a braking operation while negotiating a curve and to improve safety, the damping is increased in an actively adjustable, adaptive steering damper, which is installed in the motorcycle. The activation of steering damper LDA is carried out as a function of steering torque disturbance $M_z$ and time t according to $$LDA = f(M_z, t)$$

As a result of increasing the steering damping, only a lower steering torque disturbance is effective, so that accordingly the driver has to apply only lower countersteering torques for compensation. Since the speed of the motorcycle is reduced as a result of the braking operation, inclination angle $\phi$ is also reduced, resulting in a reduction of steering torque disturbance $M_z$. The activation of the adaptive steering damper is therefore advantageously reduced again after only a short time. This ensures that smooth steering is quickly restored, and disadvantages are avoided with respect to vibrations and vehicle controllability.

Advantageously, the change of steering damping, in particular an increase after the lapse of a defined time span, is withdrawn again, or is at least reduced, to ensure that smooth steering is quickly restored and disadvantages are avoided with respect to vibrations and vehicle controllability.

If necessary, additional state variables ascertained from sensors on-board the motorcycle are considered when setting the steering damping; these include, for example, the steering angle, the steering torque, the yaw rate and/or the vehicle speed. The processing of the data ascertained from sensors occurs in a regulating or control device, in which sensor signals are generated for adjusting the adaptive steering damper.

What is claimed is:

1. A method for reducing a steering torque of a two-wheeler when negotiating a curve, comprising:
   detecting, using a sensor, a braking force applied to a front wheel; and
   responding to the detected braking force by increasing a damping in an adaptive steering damper as a function of at least one state variable characterizing the negotiation of the curve.

2. The method as recited in claim 1, wherein the state variable characterizing the negotiation of the curve is an inclination angle of the two-wheeler, the damping in the steering damper being increased with an increase in a size of the inclination angle.

3. The method as recited in claim 1, wherein the damping in the steering damper is increased with an increased braking torque on the front wheel.

4. The method as recited in claim 1, wherein at least one of a steering angle, the steering torque, a yaw rate, and a vehicle speed are considered as the state variable characterizing the negotiation of the curve.

5. The method as recited in claim 1, wherein a change of the damping in the steering damper is withdrawn after a lapse of a defined time span.

6. The method as recited in claim 1, wherein a change of the damping in the steering damper is only carried out when the state variable characterizing the negotiation of the curve exceeds a threshold value.

7. The method as recited in claim 1, wherein a change of the damping in the steering damper is withdrawn when the state variable characterizing the negotiation of the curve falls below a threshold value.

8. A control unit comprising:
   a processor coupled to a sensor arrangement, wherein the processor is configured to, based on output of the sensor arrangement, reduce a steering torque of a two-wheeler when negotiating a curve by:
      detecting a braking force applied to a front wheel; and
      responding to the detected braking force by increasing a damping in an adaptive steering damper as a function of at least one state variable characterizing the negotiation of the curve.

9. A two-wheeler comprising:
   at least one sensor for ascertaining at least one state variable characterizing a negotiation of a curve and for ascertaining a braking torque acting on a front wheel of the two-wheeler;
   an adaptive steering damper; and
   a control unit that includes a processor coupled to the at least one sensor, wherein the processor is configured to, based on output of the at least one sensor, reduce a steering torque of a two-wheeler when negotiating a curve responding to the ascertained braking torque by increasing a damping in the adaptive steering damper as a function of at least one state variable characterizing the negotiation of the curve.

10. The two-wheeler as recited in claim 9, further comprising a sensor for ascertaining an inclination angle.

11. The two-wheeler as recited in claim 9, further comprising at least one sensor for ascertaining at least one of a steering angle, the steering torque, a yaw rate, and a vehicle speed.

12. The two-wheeler as recited in claim 9, further comprising an anti-lock braking system.

13. The two-wheeler as recited in claim 9, further comprising a steering torque actuator for actively setting the steering torque.

\* \* \* \* \*